United States Patent [19]

Webb et al.

[11] Patent Number: 4,971,477

[45] Date of Patent: Nov. 20, 1990

[54] SECONDARY CONTAINED FLUID SUPPLY SYSTEM

[75] Inventors: Michael C. Webb, Chesta Springs, Pa.; Thomas F. Wilson, The Woodlands, Tex.

[73] Assignees: Total Containment, Inc., Exton, Pa.; Exxon Company, Houston, Tex.

[21] Appl. No.: 288,131

[22] Filed: Dec. 22, 1988

[51] Int. Cl.⁵ ............................................. F16L 1/00
[52] U.S. Cl. ............................ 405/154; 137/236.1; 138/114; 405/52; 405/184
[58] Field of Search ............. 405/154, 157, 184, 52, 405/53, 54; 137/234.6, 236.1, 312, 263, 370; 138/114; 141/86; 222/108; 220/18

[56] References Cited

U.S. PATENT DOCUMENTS

| | | |
|---|---|---|
| 1,188,446 | 6/1916 | Haines . |
| 1,375,363 | 4/1921 | Cary . |
| 2,336,150 | 12/1943 | Horvath ........................... 137/234.6 |
| 2,507,597 | 5/1950 | Holddridge . |
| 3,543,377 | 12/1970 | Bremner ........................ 405/154 X |
| 3,672,103 | 6/1972 | Kost . |
| 4,132,083 | 2/1979 | McGrath . |
| 4,449,853 | 5/1984 | Mennella et al. .................... 405/184 |
| 4,565,351 | 1/1986 | Conti . |
| 4,639,164 | 1/1987 | Pugnale . |
| 4,682,911 | 7/1987 | Moreland . |
| 4,702,645 | 10/1987 | Skinner et al. ...................... 405/154 |
| 4,770,562 | 9/1988 | Muller ............................... 405/154 |
| 4,778,310 | 10/1988 | Moreland . |

OTHER PUBLICATIONS

Catalog for Concrete Professionals–4 sheets 7823 Lorsdale Rd., Springfield, VA 22150.

Primary Examiner—David H. Corbin
Attorney, Agent, or Firm—Shlesinger & Myers

[57] ABSTRACT

A secondarily contained piping system has two spaced access chambers interconnected by a secondary containment pipe to provide a sealed housing for a flexible fluid supply pipe, the ends of which are disposed within the access chamber and have a connector element at each end forming a section adaptable to be interconnected to other fluid conduits, the diameter and bending radius of the fluid supply pipe and the size of the access chamber permitting the fluid pipe after uncoupling to readily be removed from the secondary containment pipe through one of the access chambers.

47 Claims, 5 Drawing Sheets

SECONDARY CONTAINED FLUID SUPPLY SYSTEM

FIELD OF THE INVENTION

This invention relates to a secondarily contained fluid supply system, and particularly to such a system which will give timely notice of a leak and can be immediately and inexpensively repaired.

BACKGROUND OF THE INVENTION

Secondary containment systems have been developed to overcome the environmental problems that have been encountered with respect to leakage of hazardous fluids from tanks and pipe lines. This has been a particular problem with underground installations in which undetected leakage of hazardous fluids into the surrounding terrain over long periods of time without detection has produced harmful conditions and extensive pollution which are difficult and expensive to clean up when they are ultimately found.

The petroleum, chemical, and natural gas industries have long recognized that conventional un-contained underground piping is a major source of leaks and consequent product loss and pollution liability. Conventional underground fluid piping systems are typically made of steel or plastic which include rigid straight lengths of pipe, tee fittings, elbows, connectors, unions, and swing joints or flexible connectors. The assembly of those components creates a fluid piping system with many joints and typically a layout design that has many turns and congested plumbing areas. The primary source of leaks is the joints in the numerous associated fittings which can be effected by ground movement, improper installation and corrosion.

Un-contained conventional underground piping systems, which transmit hazardous fluids, have been responsible for, contamination of ground water, fires and explosions, due to leakage. In response to a public mandate to stop environmental pollution and prevent these safety hazards from occurring, federal, state and local regulatory agencies have implemented strict regulations and building codes for underground piping which transmit hazardous fluids.

Equipment manufacturers have responded by developing and producing a variety of secondary containment systems for conventional underground piping which are designed to contain and prevent any leakage from escaping into the environment. Many of these secondary containment systems have proven to be effective containment but have been found to be of an unexceptable design and difficult and costly to install and service.

One approach to secondary containment of underground conventional piping has been to line the piping trench with a product impervious flexible membrane liner or a semi-rigid trough. The technique can provide a measure of secondary containment of leaking product, but such an approach does not allow for effective leak detection, in that it does not permit determination of which piping line is leaking, the location of the leak in the piping line and when the leak occurred. This type of secondary containment system requires that all contaminated backfill materials contained within the trench be removed after a leak has been repaired. Also, integrity testing of such a secondary containment system, by means of air pressure testing, is not possible. Further, such secondary containment systems, generally, do not provide 360° containment and, therefore, can fill with water, thereby eventually becoming ineffective.

Another approach toward solving the problem of leakage from the underground conventional piping has been to install a larger semi-conventional piping system over the conventional product piping as a means of secondary containment. In such an arrangement, the outer secondary containment rigid pipe is installed simultaneously with the product piping. The outer secondary containment pipe by necessity, has a larger diameter than the product supply pipe to enable the secondary containment pipe to slide over the smaller diameter product supply pipe. The secondary containment pipe fittings are of a clam shell design adapted to fit over the product supply pipe fittings and connect to the secondary containment pipe. The clam shell fitting is sealed to itself and the secondary containment pipe by a variety of sealing techniques. Depending on the type of secondary containment system used these sealing techniques could include metal or plastic fasteners used with a combination of adhesives, sealants and rubber gaskets. Such secondary containment systems are generally, expensive to install, because of the cost of the components which are used and the time required to assemble both the product and secondary containment piping system. In addition, such secondary containment systems, because of their design, do not allow for complete visual inspection of the entire product piping system during its integrity testing. Should a leak occur, it can be determined which product piping line is leaking, but generally cannot identify the location in the product supply pipe the leak has originated. Consequently, the entire length of the particular secondarily contained piping line must be excavated, in order to locate and repair the leak.

Yet, another approach which has been taken toward solving the problem of leakage, in underground conventional product piping, has been to install another type of semi-conventional piping system over the conventional product piping. This secondary containment system differs from the systems described above in a number of ways. The outer secondary containment pipe is not entirely a rigid straight pipe, but rather a combination of a rigid straight pipe with a larger diameter convoluted plastic pipe over it which produces a telescoping effect. The convoluted section of secondary containment pipe serves as a means of containment of the product pipe 90° and 45° fittings, as well as unions, flexible connectors and swing joints, should they be attached. This convoluted pipe is designed to be flexible and sized to be shifted around any angles in the product piping systems. The only fitting required for this type of secondary containment system is a non-split oversized tee fitting which is sized large enough to insert the product piping tee fitting prior to assembly of the product piping. This secondary containment system makes sealed connections by means of rubber gaskets in combination with metal band clamps. Such secondary containment systems are less expensive to install than those previously stated and do allow for complete inspection of the product piping system during integrity testings. Also, this type of secondary containment system can be integrity tested by means of air testing and should a leak occur, it can be determined which product piping line is leaking but generally cannot identify the location in the product pipe the leak has originated. Consequently, the entire length of the particular secondarily contained pipe line must be excavated, in order to locate and repair.

Generally, consideration for both present and future regulatory and user requirements for underground product piping dictate that the piping system possess a number of basic characteristics and meet a number of design, testing and service criteria. Among the basic characteristics and criteria are:

(1) The product piping line should be of such a design that all components from beginning to end be secondarily contained.

(2) Both the product piping and the secondary containment pipe be compatible with the fluids to be transmitted.

(3) The secondary containment system must be made of materials which is non-corrosive, dielectric, non-degradable and resistant to attack from microbial growth found in many soils.

(4) The secondary containment system must be designed and made from a choice of materials which provides sufficient strength to withstand the maximum underground burial loads.

(5) After installation, connection and sealing of the product piping line, the secondary containment system shall permit complete view of the product piping and its associated fittings and components during integrity testing.

(6) The secondary containment system should provide a means of leak detection.

(7) The product piping and its secondary containment system should each provide a means to perform an air pressure and/or hydrostatic integrity test.

(8) Should a leak occur in the product piping, the secondary containment system and/or its leak detecting system should be able to identify the exact location of the leak.

It is the purpose of this invention to address these problems.

SUMMARY OF THE INVENTION

Accordingly, it is a principal object of this invention to provide a new type of secondarily contained piping system not having the drawbacks of existing secondarily contained piping systems.

It is a principal feature of this invention to provide a secondarily contained piping system which is relatively inexpensive to install, quickly locates a leak anywhere in the system, and which permits an underground piping system to be quickly repaired or replaced without requiring excavation.

This is made possible by the use of a secondary containment system consisting of two or more access chambers interconnected with a section of secondary containment pipes, each of sufficient size to permit access to removal and replacement of the contained flexible inner supply pipe.

Further, the flexible inner supply pipe, because of its flexibility and availability in relatively long lengths eliminates the need for directional fittings and couplings. Consequently, the incidence of fluid leak which occurs primarily in the points of the fittings, will be reduced. The failure of the joints is attributable to such factors as improper installation, corrosion, and ground movement.

These and other features and advantages of this invention will become apparent from the following description and claims.

DESCRIPTION OF THE INVENTION

Figure 1:
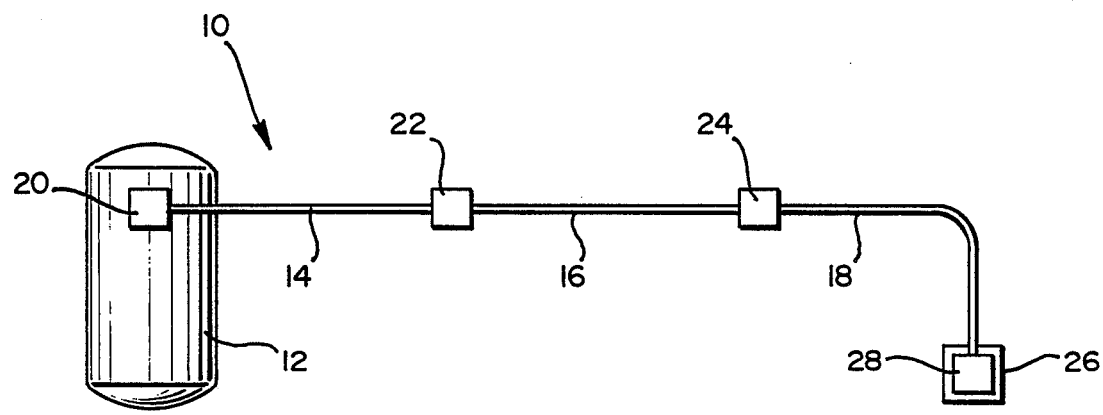
FIG. 1 is a diagrammatic plan view of a fuel supply and dispensing system using a segmented double pipe and access chambers for supplying vehicle fuel.
Figure 2:
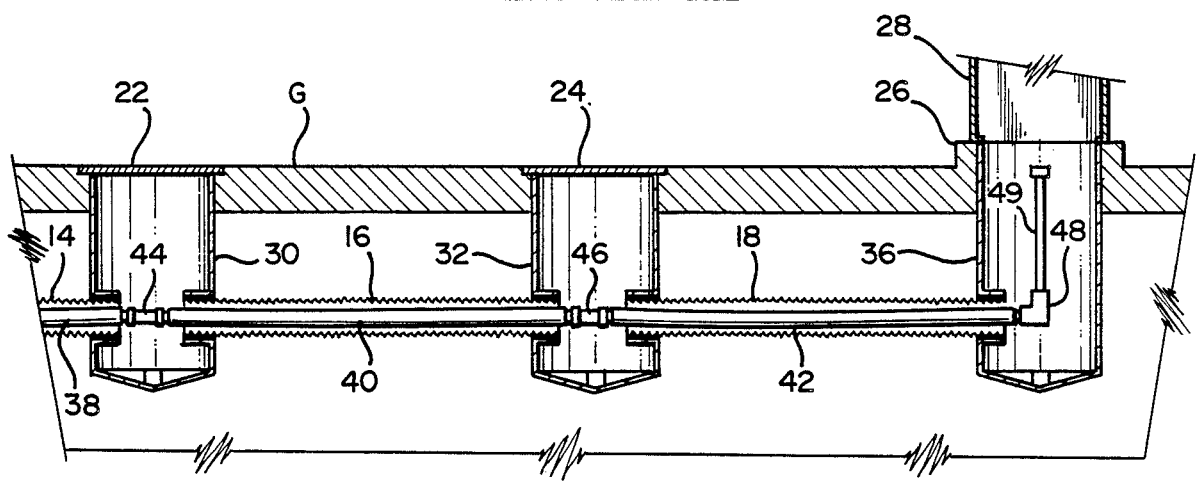
FIG. 2 is an enlarged side view of a portion of the fuel dispensing system shown in FIG. 1.
Figure 3:
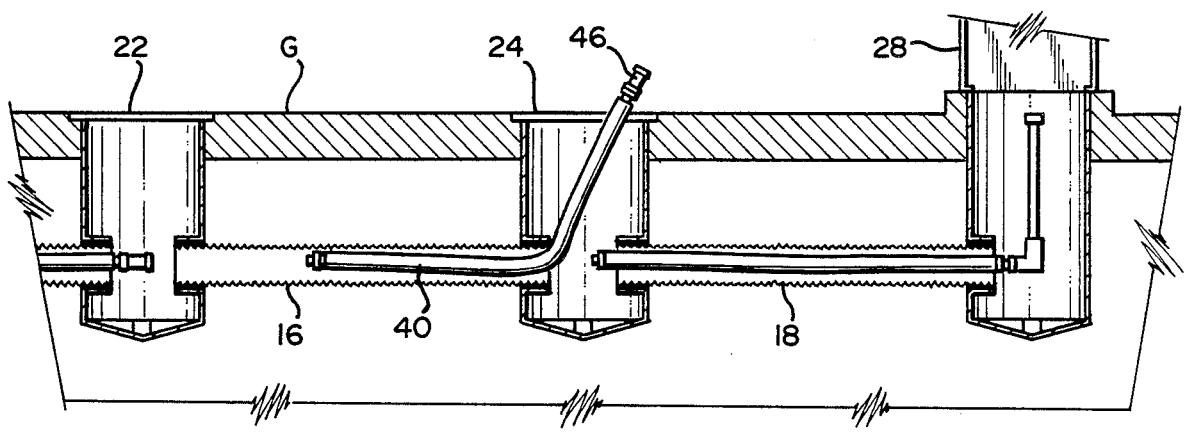
FIG. 3 is a view similar to the system of FIG. 2, showing removal of a flexible fluid supply pipe segment.

Referring to FIGS. 1 to 3, an underground fuel storage and dispensing system, generally indicated at 10 has a fuel tank 12 to which segmented containment pipe sections 14, 16 and 18 are connected. The access chamber 20 interconnects containment pipe 14 with the fuel supply tank. Access chambers 22 and 24 interconnect containment pipe segments 14, 16 and 18. Access chamber 26 is disposed beneath surface dispensing station 28.

FIG. 2 shows the manner in which the double pipe sections of secondary containment pipe and its corresponding flexible supply pipe are interconnected through the access chambers. The access chambers 22, 24 and 26 have side walls 30, 32 and 36 through which the secondary containment pipes 14, 16, and 18 extend as shown. The flexible supply pipes 38, 40 and 42 are interconnected by fluid tight pipe fittings 44, and 46.

The supply pipes are 1½ to 2 inch diameter pressure rated flexible pipes made of reinforced positive materials, such as polyethylene and rubber, and are impervious to and compatible with the particular fluids they are to carry. The flexible supply pipe is usually pressure rated for from 10 to 100 pounds per square inch. The length of the flexible supply pipes 40 and 42, are shown to be slightly longer than their corresponding secondary containment pies 16 and 18. All connections between adjacent flexible supply pipe sections, as well as the secondary containment pipe section, are made entirely within their common access chamber. Further, the use of a continuous uninterrupted length of flexible supply pipe in a given section of secondary containment pipe is important, because it reduces the number of joints, which have historically been the source of most leaks.

The secondary containment pipes can be lengths of PVC plastic or fiberglass pipe. It is essential that these pipes, which are exposed to both underground and to other ambient conditions, be both impervious to those conditions on the exterior, as well as to the fluid being conveyed by the flexible supply pipes. Consequently, this material must be non-corrosive, dielectric, non-degradable, and resistant to attack from microbial growth that may be found in soils in which it is used. It should also be of sufficient strength to withstand loads to which it is subjected, for example, compressive loads encountered after installation underground. Preferably, a corrugated containment pipe construction is employed. This is the construction shown. It provides rigidity as well as flexibility to make a bend such as that shown in FIG. 1. The wall of such a pipe is approximately 60 to 90 mils in thickness.

There must also be sufficient clearance between the containment pipe and the flexible supply pipe to permit it to move through the containment pipe. Preferably, the ratio of the containment pipe inner diameter to the outer diameter of the flexible pipe is greater than 1½ to 1. The flexible supply pipe outer diameter, for example, is 1½ to 2 inches for fuel supply applications, and the inner diameter of the corrugated secondary containment pipe is 3½ to 4 inches. Both the length of the double pipe sections, as well as the relative diameters will be affected by the pipe configuration. Where there is a turn in the pipe section, such as that shown in FIG. 1, allowance must be made for possible binding at the turn. A minimum turning radius of 12 inches is practical in this application.

FIG. 3 illustrates the manner in which a section of flexible supply pipe is removed for repair or replacement. Pipe section 40 is uncoupled from its adjacent fluid supply pipe 38 at union 44, and from flexible supply pipe 42 at union 46. Both of these fittings are accessible from the ground level G through their tops on removal of sealing access chamber covers not shown. It should be noted that with the removal of the covers, the complete installation at the lower of the access chamber is visible and accessible. This permits visual inspection to be made of the entire system merely by removing the covers to determine whether any fluid leakage has accumulated. Leakage accumulation in any access chamber indicates leakage in either that coupling or in one of the two adjacent flexible supply pipes. Some installations may elevate with respect to the horizontal, so that fluid accumulation in a given access chamber will indicate leakage in either the fitting assembly, or the elevated flexible supply pipe.

It is essential that the entire secondary containment pipe be tightly sealed. FIGS. 4 through 9 illustrate the manner in which pipe ends interconnect with and extending through the wall of the access chamber are effectively sealed. These are resilient compressible seals which are sufficient to meet air pressure, and hydrostatic integrity tests, to which the entire system can be subjected to assure absence of leaks.

Figure 4:
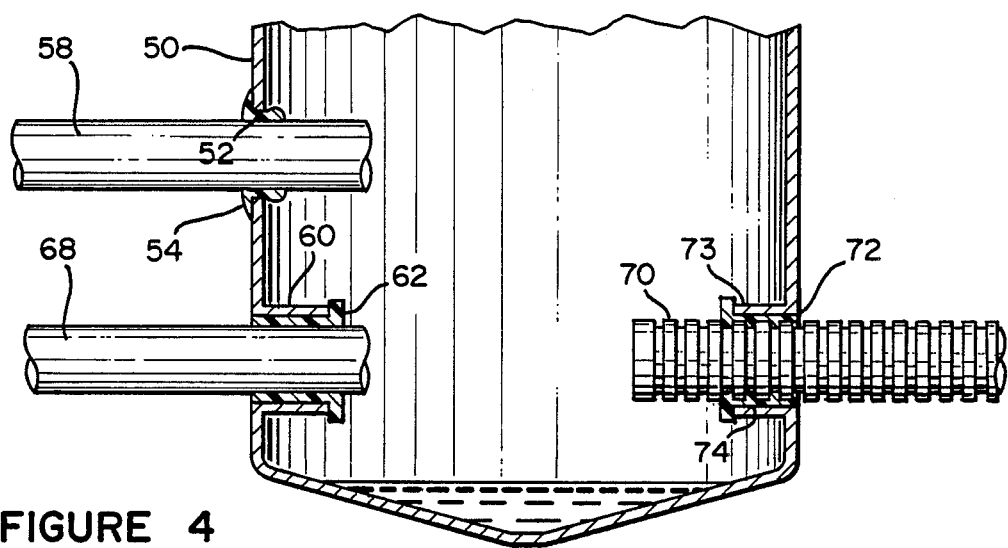
FIG. 4 is a side cut-away view of a typical access chamber lower portion.
Figure 5:
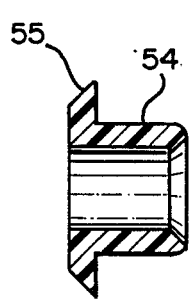
FIG. 5 is a sectional view of one of the sealing gaskets of FIG. 4.
Figure 6:
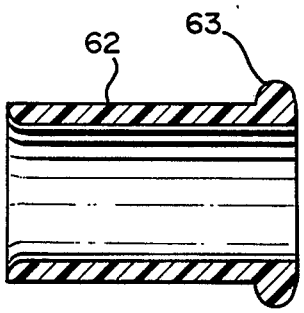
FIG. 6 is a sectional view of the elongated sealing sleeve shown in FIG. 4.
Figure 7:
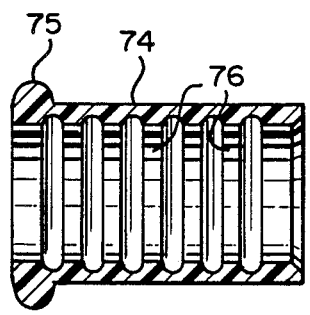
FIG. 7 is a sectional view of the internally ribbed sealing gasket shown in FIG. 4.

Referring specifically to FIG. 4, the access chamber 50, has a flexible resilient seal 52, which compressively holds and seals an end section of rigid pipe 58 which could be an electrical conduit or a vapor return line. An internally protruding annular cuff section 60, receives a sleeve-like resilient seal 62, which is compressively engaged with the end of pipe 68. It will be noted when referring to the cross-sectional views of the compressible seals in FIGS. 5 and 6, that each of these seals have flanges 55 and 63, which engage and assist in completing a seal with the access chamber surface.

Both pipe 68 and pipe 70 of FIG. 4, are secondary containment pipes. The secondary containment pipe 70 is corrugated to provide extra rigidity and flexibility. It is received through the access chamber 72 and the annular cuff section 73. The resilient annular sealing sleeve 74, is compressively held between the annular cuff section 73, and the exterior of the corrugated containment pipe 70. It has inwardly extending ribs 76 for engaging the external periphery of the corrugated containment pipe, and a flange section 75.

An accumulation of fluid is shown at the bottom of access chamber housing 50 to illustrate the manner in which leaking fluid is collected within the access chamber below the interconnected containment pipes.

Figure 8:
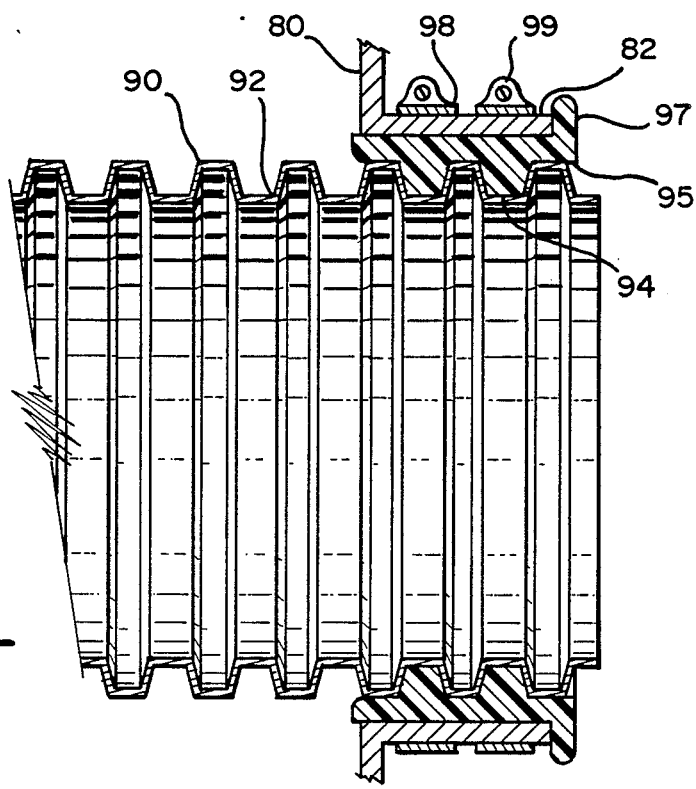
FIG. 8 is an enlarged sectional view of a typical access chamber connection.

Preferably, the access chamber annular cuff sections 60 and 73, are tightened about the flexible sleeve members by compression bands. This is illustrated in FIG. 8, where the annular cuff 82 of the housing 80, receives the end of a corrugated containment pipe 90, having corrugations 92, which receive the annular ribs 94 of the resilient sealing sleeve 95. It has a flange 97, which engages the innermost end of the annular cuff section 82.

Circular metal bands 98 are placed about the annular cuff section 82. They have screw tightening lug assemblies 99, which can be tightened to bring the bands into pressure engagement with the annular cuff section 82, thus tightening it against the resilient sealing sleeve 95.

Figure 9:
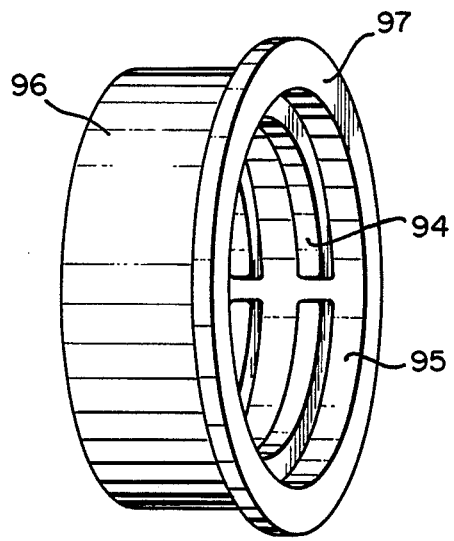
FIG. 9 is a perspective view of the resilient sealing gasket shown in FIG. 8.

FIG. 9 is a perspective view of the resilient sealing sleeve 96.

Figure 10:
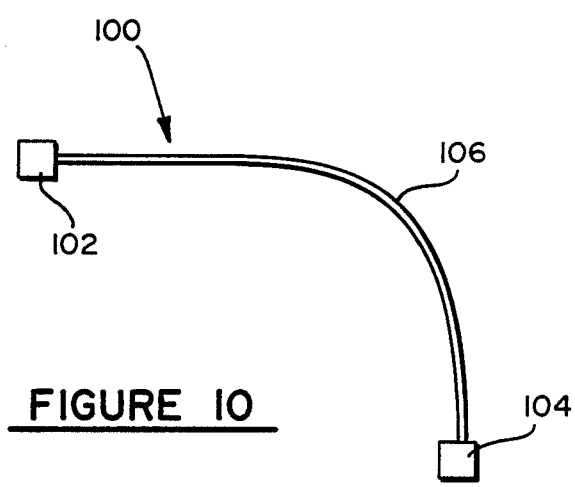
FIG. 10 is a diagrammatic view of a pipe segment which is curved.
Figure 11:
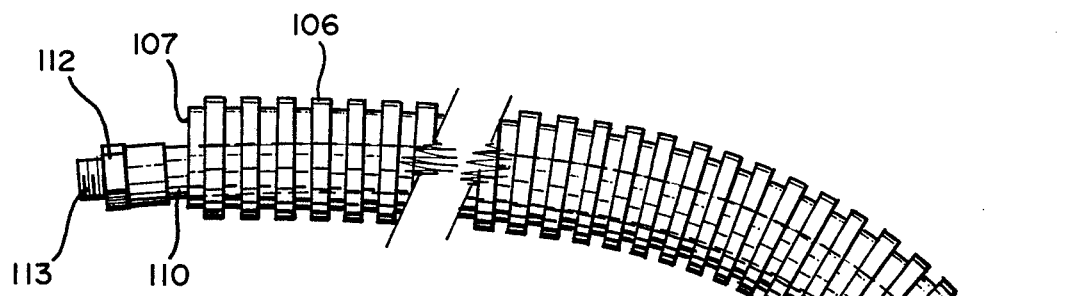
FIG. 11 is an enlarged partial plan view of the pipe segment of FIG. 10.

FIGS. 10 and 11 show the manner in which a corrugated secondary containment pipe section can be bent to eliminate a fitting such as an elbow. Referring to FIG. 10, the pipe segment section generally indicated at 100, includes the access chambers 102, and 104 which are connected by the length of curved secondary containment pipe 106.

FIG. 11 is an enlarged view showing how this section of corrugated secondary containment pipe 106, is shorter in length than the flexible inner supply pipe 110, which extends beyond the ends 107 and 108 of the corrugated secondary containment pipe 106. The couplings may have tightening nuts 112 and 114 for tightening, which are disposed immediately behind the threaded ends 113 and 115. Note the difference in diameter between the pipes. Sufficient clearance is necessary to prevent restriction of the flexible supply pipe through the secondary containment pipe. Both the diameter, and the length of the segments are factors that will effect the ability to move the inner flexible supply pipe through the secondary containment pipe. The lengths of the two element double wall assembly shown, using corrugated pipe, are typically 10 to 100 feet.

Figure 12:
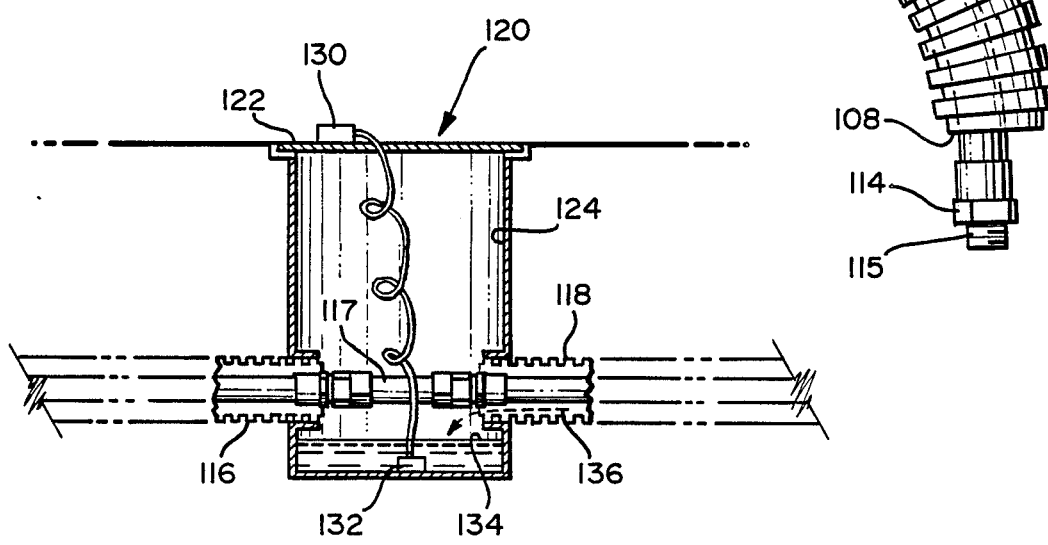
FIG. 12 is a diagrammatic view of an access chamber with leak detector apparatus.

FIG. 12 is a side cut-away view of an access chamber and containment pipe assembly illustrating diagrammatically the use of fluid sensing apparatus. The access chamber generally indicated at 120, has a cover 122. The access chamber interconnects secondary containment pipes 116 and 118, which are connected by the connector fitting 117. A fluid sensor 132 is disposed in the bottom of the access chamber 120, and is electrically connected to an indicator or alarm 130. When there is an accumulation of fluid, such as indicated at 134 by leakage 136 along the lower interior of secondary containment pipe 118, the accumulated fluid 134 will activate the sensor 132 and its connected indicator or alarm unit 130. The fluid sensor and alarm apparatus have been used in connection with storage tanks, and can similarly be employed with respect to fluid accumulation in the access chamber of the secondarily contained piping system.

Figure 13:
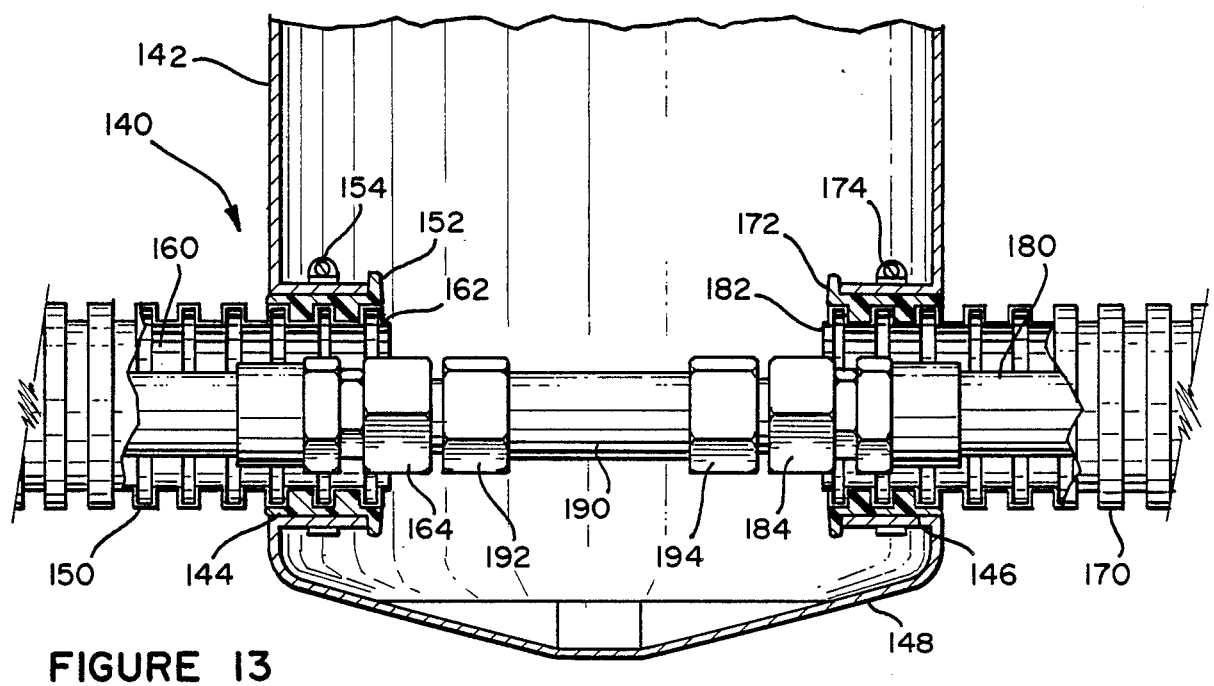
FIG. 13 is an enlarged view of the lower section of an access chamber illustrating the coupling arrangement between adjacent pipe sections.

FIG. 13 is an enlarged view of the lower portion of an access chamber 140, showing the manner of two corrugated secondary containment pipe sections and coupling of the flexible supply pies. The access chamber 140 has a side wall 142, with annular sealing 144 and 146 for receiving the secondary containment pipes 150 and 170, and a lower fluid collection section 148.

The corrugated secondary containment pipe 150, extends through the annular cuff section 144, and is held into position by the ribbed annular sealing sleeve 152, fitted between the corrugated containment pipe 150, and the annular cuff section 144. A tightening band assembly 154, completes the connection. The flexible supply pipe 160 extends through the containment pipe 150, extending beyond its end at 162 to expose the tightening nut 164. Similarly, the secondary containment pipe 170 extends into the access chamber interior through wall 142 and annular cuff section 146.

The annular sealing sleeve 172, is compressibly held in sealing engagement between the outer wall of the secondary containment pipe 170, and the inner surface of the annular sealing cuff 146.

The flexible supply pipe extends beyond the end 182 of the secondary containment pipe 170, so that its tightening nut 184 is accessible.

The connector fitting 190, having coupling nuts 192 and 194 engage the threaded ends of the pipes which extend beyond the tightening nuts 164 and 184.

Figure 14:
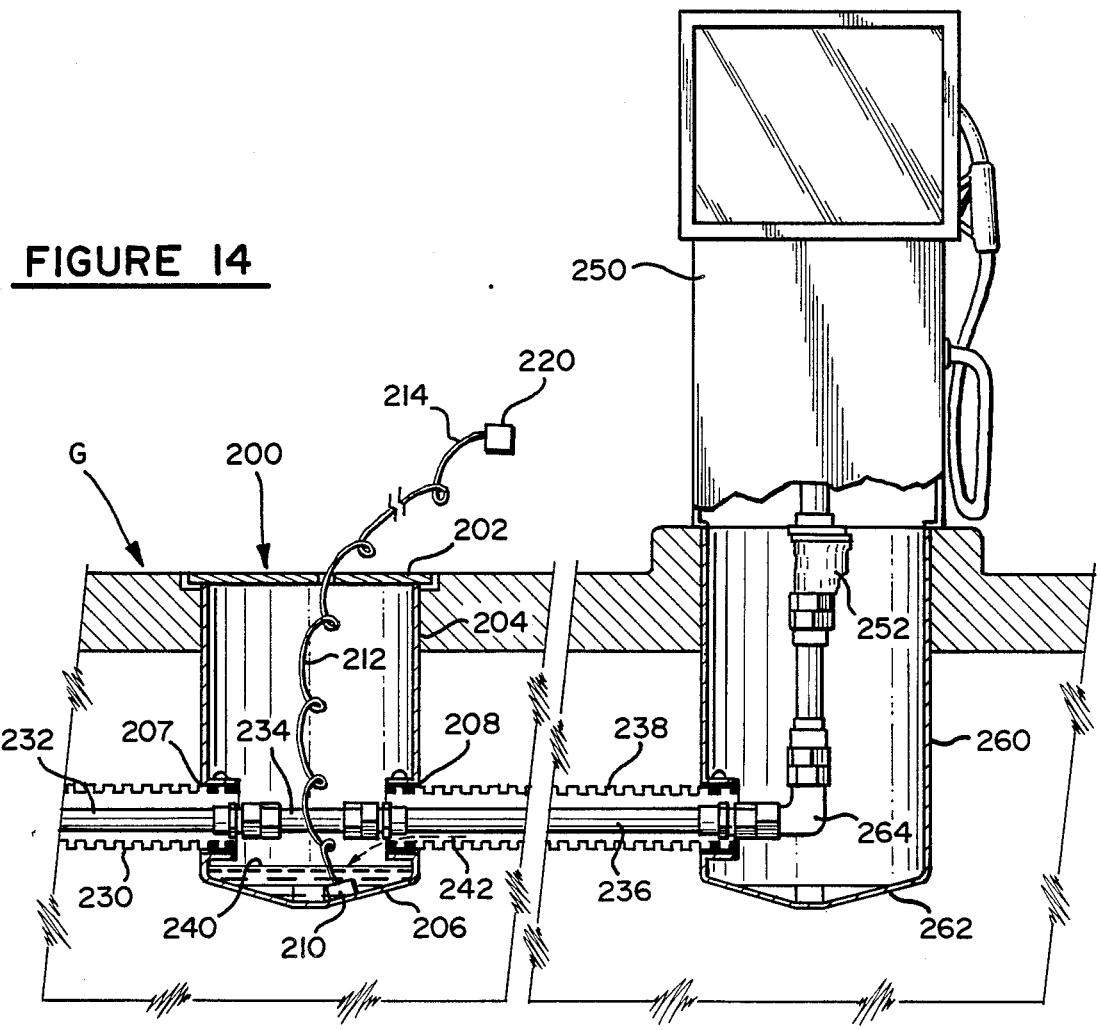
FIG. 14 is an enlarged sectional view of the access chambers for a fuel supply system as shown in FIGS. 1 through 3.

FIG. 14 shows an enlarged more detailed view of the access chamber and a fuel dispensing unit in a fuel supply system, such as shown in FIGS. 1 to 3.

The access chamber 200, located below ground level generally indicated at G, has a removable cover 202. As shown, the access chamber has a lower fluid collection section 206. Cuff sections 207 and 208, receive the secondary containment pipes 230 and 238.

A fluid sensor 210 is connected by wire 212 through the cover 202 of the access chamber and line 214 to an alarm circuit 220 shown schematically). The access chamber receives the secondary containment pipe 230 and its corresponding flexible supply pipes 232. It is connected by the connector fitting 234, to the flexible supply pipe 236, contained within corrugated secondary containment pipe 238.

An accumulation of fluid 240 is shown in the access chamber as accumulating from a leak which flows as generally indicated by dotted line 242 into the access chamber. In this instance, the secondary containment pipe slopes upwardly away from the access chamber 200 so that flow will proceed in the direction as shown. This makes it possible to determine from inspection that the leak would be either in the couplings, or from flow proceeding along the upwardly inclined secondary containment pipe 238.

The detail of the access chamber well disposed beneath a fuel dispensing unit 250, is illustrated in which the access chamber 260 receives the ends of the secondary containment pipe 238, and of the inner flexible supply pipe 236. It also has a lower fluid accumulating section 262 disposed below an elbow fitting 264 which connects the safety valve 252 to the end of the flexible supply pipe 266. Although not shown, a fluid sensor may also be installed in access chamber 260, as well as any other access chamber.

All of the fitting, connections and pipe entries are fluid tight. Details of the vent and vapor return systems which are used with fuel supply systems are not shown. The vapor return pipes would similarly interconnect multiple sections with the access chambers of the fluid supply system.

Figure 15:
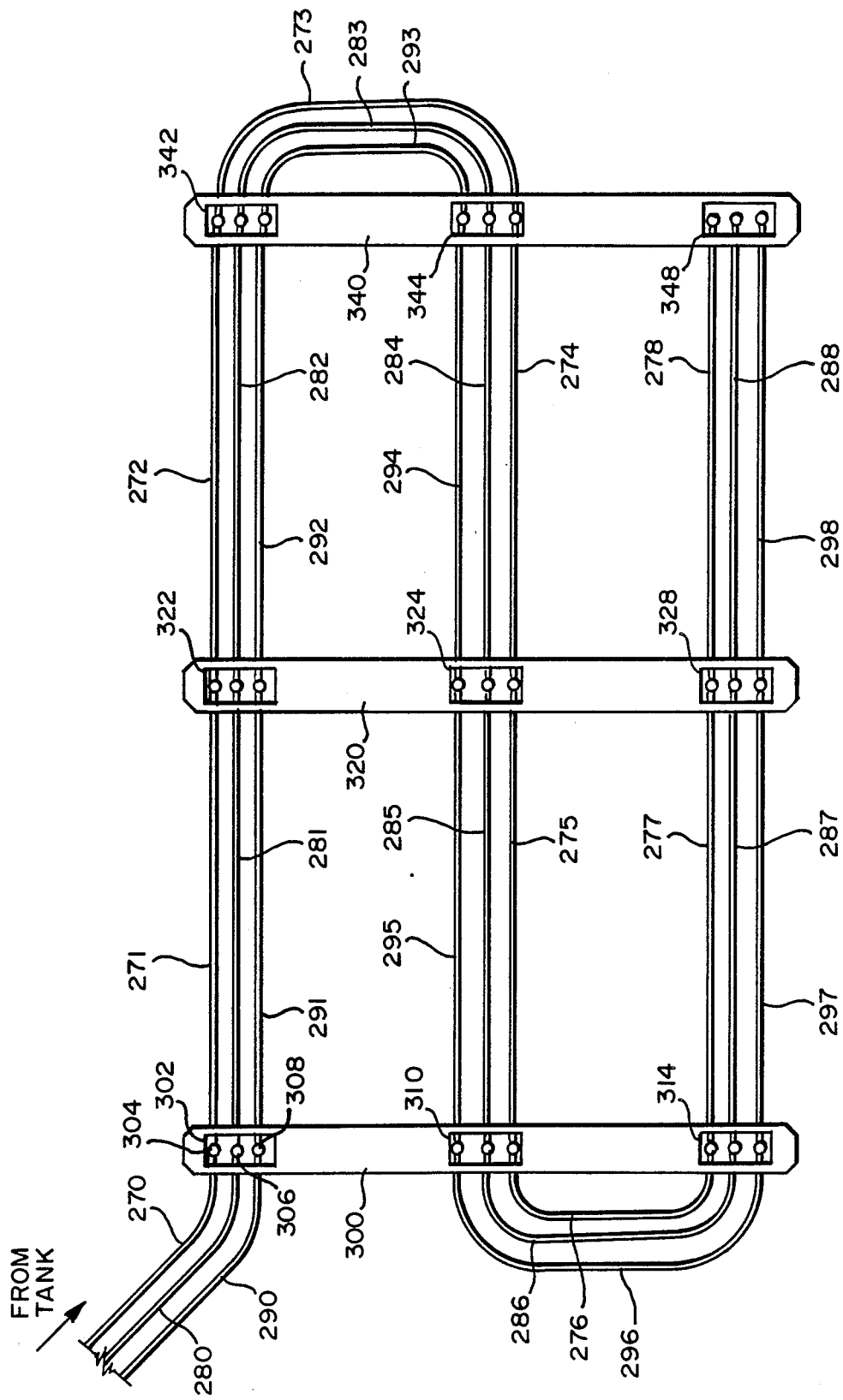
FIG. 15 is a view of a fuel distribution lay-out for a multiple island surface station having multiple product dispensers.

FIG. 15 shows the preferable method for supplying fuel to a gasoline service station having three service islands. The islands each have a set of three multiple product dispensers for three grades of motor fuel. This supply pipe layout shows a series routing scheme utilizing fittings in the access chambers disposed below the multiple product dispensers. For illustration purposes, only the flexible fuel supply pipe is shown.

The flexible supply section carries the fuel from a storage tank, not shown, to the service island 300 and pass into the interior of the access chamber 302 where they are respectively connected to the "T" fittings 304, 306, and 308. The top connection from these fittings are directly connected to the respective safety valves of each multiple product dispenser through flexible supply pipe sections, to make available three different grades of fuel. The service island 300 also has access chambers 310 and 314 each disposed beneath a multiple product dispensing unit. Note that it is possible to have a bend in fluid supply sections 270, 280 and 290, without requiring a fitting.

The flexible fuel supply pipe sections 271, 281, and 291, extend from access chamber 302 of island 300 to access chamber 322 of island 320. The flexible supply line sections 270 and 271, are connected through the tee fitting 304. The secondary containment pipe sections for each of these pipe sections 270 and 271 are not shown. However, the connection of the secondary pipe to the access chambers, as well as the fitting type of connection shown for the coupling in FIG. 13, are similar in construction and arrangement. This is true for each tee connection of adjacent ends of successive flexible pipe sections.

The access chambers 322 and 342 of the islands 320 and 340 are similarly connected by flexible supply pipe sections 272, 282, and 292. It should be noted that the arrangement of the successive pipe sections of each of the three pipe sections, such as sections 270, 271, and 272, are a series routing, with the supply to the multiple product dispensing units, coming directly from the top of the tee fittings in the access chambers.

The versatility of the flexible supply pipe, and its ability to eliminate fittings is shown in the two 90° slow bends made in supply pipe sections 273, 283 and 293. Although shown as a two bend configuration, the flexibility of the pipes permit variable routing angles and configurations. The interconnection of access chambers 342 and 344, directly, while avoiding the footing below the island between the multiple product dispensing units 342 and 344 is shown. It also redirects the fluid supply lines back toward islands 320 and 300. Flexible supply pipe sections 274, 284, and 294 proceed to carry the fuel back to these islands, interconnecting access chambers 344 and 324. Access chambers 324 an 310 are similarly connected by flexible pipe sections 275, 285 and 295.

Access chambers 310 and 314 of island 300 are interconnected by flexible supply pipe 276, 286, and 296 with two 90° slow bends made in each flexible supply pipe, and redirecting the direction of flow of the fuel toward islands 320 and 340. Access chambers 314 and 328 are interconnected by flexible supply pipes 277, 287, and 297. Similarly, access chambers 328 and 348 are interconnected by flexible supply pipe sections 278, 288, and 298.

It should be noted that using the same island and dispenser arrangement, as shown in FIG. 15, there could be a variety of other routing schemes which could be used. All fittings, connections and joints are exposed in access chambers.

For example, the flexible supply pipes could be routed from access chamber 302 to 310 to 314 on island 300. Thence on to access chamber 328, to 324, to 322 on island 320; Thence to access chamber 342, to 344 and terminate at access chamber 348 on island 340. The connections would be similar to those between access chambers 342 and 344.

Another example would be to branch the main supply pipes into separate circuits within the access chamber located at the storage tank or intermediary access chamber. Through use of a "Y" shaped fitting and route each line in series as described in preceding examples.

Where there are multiple product offerings, multiple parallel lines for each of the grades of fuel are run from storage tanks. The flexible supply lines for the different grades would run parallel to each other and connect to a common access chamber, so that there would be multiple sets of secondary containment pipe sections connecting to each side of an access chamber, instead of the single secondary containment pipe sections shown in the drawings.

In this respect also, it is possible to have multiples types of fittings, in which one single double wall containment section applied would come into an access chamber to which it would be connected to a "Y" fitting. A flexible supply line could be connected to each of the diverging legs of this fitting, such that two separate flexible supply lines would run from the common access chamber containing the "Y" connection.

For vehicle fuels, a preferred flexible fluid supply line would have an inner 30 to 50 mil lining of cross-linked polyethylene modified for flexibility, successively covered by an intermediate 100 to 200 mil thickness buna rubber containing steel mesh, in turn covered by a circular wall jacket of from 5 to 10 mils of vinyl or polyethylene with good wear and low friction characteristics. This will provide the long life characteristic with a flexibility and impermeability suitable for fuel characteristics. In handling of fuel, such as gasoline, for example, which is very volatile, it is important that the fluid supply line material be highly impervious to the fuel to avoid gasoline vapor built-up.

One of the other considerations with respect to this invention is the ability of the threaded end of the flexible fluid supply pipe to be moved through the secondary containment pipe. The simplest manner of replacing a given section of flexible supply pipes is to connect the replacement section of flexible supply pipe directly to the end of the length to be removed. In this manner, removal of the original pipe section will automatically draw the new replacement section into the original position occupied by the original section of flexible supply pipe being replaced. In some instances, the construction of the fitting may have a tendency to impede longitudinal movement of the flexible supply pipe section, for example, with square edged corrugated pipe. If this does present a problem with the fitting to be used, either convoluted pipe having a more rounded rib may be used, or a smooth sleeve of polyethylene placed over the fittings to reduce the possibility of catching a resistance.

In this respect, it should be noted that there are a number of factors that must be taken into consideration, all of which have an affect on movement of the flexible supply pipe through its containment pipe section. Some of these factors are relative diameter of the pipes, type of lining, the pressure of the fluid, the overall length of the section, and the configuration of the containment pipe.

Although not shown, access chambers located at the fuel storage tanks would also be interconnected with fluid tight secondary containment pipes. This will permit the interconnecting of different product storage tanks with different flexible product pipes routed to the product dispensing units without the need to excavate.

Whenever additional product dispensing units or islands are added to a facility which was originally constructed with this system, up-sizing of line sizes can be accomplished without excavation.

In addition, the flexible supply pipe shall have a bend radius sufficiently small enough to be capable of being pulled out of the secondary containment pipe through the access chamber. Typically, the bend radius equals 1½ to 3 times the outer circumference of the flexible supply pipe.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A secondarily contained piping system comprising:
   (a) a flexible inner supply pipe which is fitted at each end with a coupling,
   (b) an outer secondary containment pipe having a substantially larger diameter than the flexible inner supply pipe,
   (c) two spaced underground access chambers which are interconnected in a fluid tight manner through the side wall just above the chamber base, by the secondary containment pipe,
   (d) all flexible inner supply pipe couplings and associated fittings being disposed within the access chambers,
   (e) a fluid source providing an originating interface to the flexible inner supply pipe,
   (f) a fluid outlet providing a terminating interface to the flexible inner supply pipe,
   (g) access chambers are of sufficient size to permit manual or mechanical removal or replacement of the flexible inner supply pipe,
   (h) the flexible inner supply pipe having sufficient bend radius to be removed and replaced through the access chambers,
   (i) all components of the system being chemically compatible with and impervious to the fluids to be transmitted and with the surrounding environment in which they are disposed, (j) the flexible inner supply pipe and its associated couplings and fitting being of sufficient strength to withstand internal fluid pressures, and (k) the access chambers and secondary containment pipe being of sufficient strength to withstand external loads.

2. The secondarily contained piping system as set forth in claim 1, wherein:

(a) the ratio of the inner diameter of the secondary containment pipe to the outer diameter of the flexible supply pipe is at least 1½ to 1.

3. The secondarily contained piping system as set forth in claim 1, wherein:

(a) a sealing assembly interconnects the access chamber at the end of the secondary containment pipe.

4. The secondarily contained piping system as set forth in claim 3, wherein:

(a) each access chamber has a side wall integral inwardly extending annual cuff surrounding an opening through which the secondary containment pipe extends.

5. The secondarily contained piping system as set forth in claim 3, wherein:

(a) a resilient sealing sleeve which is compressively held in tight sealing engagement between the secondary containment pipe and the annular cuff section.

6. The secondarily contained piping system as set forth in claim 1, wherein:

(a) the originating and terminating interfaces are couplings or fittings.

7. The secondarily contained piping system as set forth in claim 1, wherein:

(a) the fluid source includes a second flexible supply pipe which is connected in series to the flexible inner supply through a fitting.

8. The secondarily contained piping system as set forth in claim 1, wherein:

(a) the terminating interface is a tee fitting which is connected to a dispensing unit.

9. The secondarily contained piping system as set forth in claim 1, wherein:

(a) the terminating interface is a fitting which is connected to another flexible inner supply pipe.

10. The secondarily contained piping system as set forth in claim 1, wherein:

(a) the bend radius of the secondary containment pipe is greater than the bend radius of the flexible inner supply pipe.

11. The secondarily contained piping system as set forth in claim 1, wherein:

(a) the access chamber permits a bend radius of the flexible supply pipe of 1½ to 3 times its own circumference.

12. The secondarily contained piping system as set forth in claim 1, wherein:

(a) the secondary containment piping is made of a thermal plastic material and is rigid.

13. The secondarily contained piping system as set forth in claim 1, wherein:

(a) the secondary containment piping is made of a thermal plastic material and is corrugated.

14. The secondarily contained piping system as set forth in claim 1, wherein:

(a) the access chambers interconnected with the secondary containment pipe provide a fluid tight means of secondary containment for the flexible inner supply pipe contained within.

15. The secondarily contained piping system as set forth in claim 1, wherein:

(a) the access chamber interconnected with the secondary containment pipe provides isolation of the inner contained components from corrosive and degradative elements in the surrounding environment.

16. The secondarily contained piping system as set forth in claim 1, wherein:

(a) the secondary containment pipes are slightly inclined to the horizontal to provide drainage toward a given access well.

17. The secondarily contained piping system as set forth in claim 1, wherein:

(a) the containment pipe is a corrugated flexible pipe of sufficient diameter and clearance from the flexible pipe to permit a bend in the line without requiring an elbow.

18. The secondarily contained piping system as set forth in claim 1, wherein:

(a) fluid sensing means is disposed within the access well for detecting presence of fluid, and (b) indicator means is connected to the sensor means for indicating presence of fluid.

19. The secondarily contained piping system as set forth in claim 13, wherein:

(a) the containment pipe is a corrugated flexible pipe, and (b) the annular seal is a cylindrical sleeve which has a plurality of ribs on its engaging surface which interengage the corresponding surface of the containment pipe end.

20. The secondarily contained piping system as set forth in claim 1, wherein:

(a) the secondary containment pipe is a flexible non-corrosive hydrocarbon plastic material having a wall thickness of from 50 to 100 mils, and (b) the flexible fluid supply pipe is pressure rated from approximately 10 to 100 psi.

21. A secondarily contained pipe routing system for fluid fuel dispensers comprising:

(a) a plurality of flexible fluid supply pipe sections removably interconnected at their ends by coupling fittings to form a linear plural section fluid supply line, (b) at least one of the coupling fittings of the supply pipe sections being a fluid tight tee fitting which provides a connection to a fluid fuel dispenser, (c) the terminating outlet coupling fitting being a fluid tight elbow fitting, (d) an access chamber for each coupling fitting which provides a housing through which the inner supply line extends such that all coupling fittings are disposed in an access chamber, (e) the flexible supply pipe sections are each capable of being disposed in a continuous curvilinear path, (f) a flexible secondary containment pipe encapsulating each flexible supply pipe section and providing adequate clearance therefrom to permit movement of its corresponding supply pipe section therethrough, (g) each end of all secondary containment pipes interconnected in tight sealing engagement with the two access chambers it interconnects, (h) each access chamber having an access opening at the top thereof below which the coupling fitting joining adjacent linear fluid supply line sections is disposed, (i) the access chambers having a height and width sufficient to permit introduction and removal of the flexible supply pipe sections from their respective secondary containment pipe sections within the bending radius limit of the supply pipe sections, and (j) a fluid fuel dispenser mounted on those access chambers which house either a tee or an elbow fitting, and positioned immediately above the access openings and above and connected to such fittings, 22. The pipe routing system as set forth on claim 21, wherein:

(a) at least one leak sensing device is disposed in at least one access chamber.

23. The secondarily contained fluid distribution system as set forth in claim 21, including:

(a) a service island on which a plurality of fluid fuel dispensers are positioned in a straight line configuration, and (b) the access chambers of at least two adjacent dispensers being directly connected by a supply pipe and its secondary containment pipe.

24. The secondarily contained fluid distribution system as set forth in claim 21, including:

(a) two parallel spaced service islands each having at least two spaced and aligned fluid fuel dispensers, (b) the access chamber below a dispenser on one island is directly connected to an access chamber disposed below a fluid fuel dispenser on the other island by a supply pipe and its secondary containment pipe, and (c) all of the access chambers of the dispensers on the islands are interconnected by the linear plural section fluid supply line in a series configuration.

25. The secondarily contained fluid distribution system as set forth in claim 24, wherein:

(a) at least one additional linear plural section fluid supply line of similar makeup and construction is disposed parallel to the first linear fluid supply line and similarly interconnects successive access chambers and fuel fluid dispensers associated successive access chambers and fuel fluid dispensers associated therewith in a series configuration to thereby provide each fluid fuel dispenser with a plurality of independent multiple grade fuels.

26. A secondarily contained piping system, comprising:

(a) a series of sealed linearly spaced access chambers which are disposed below ground and have a removable access opening at ground level, (b) the access chambers having a side wall with two substantially opposed secondary containment pipe receiving openings, (c) the side walls adjacent each opening having an engaging element adjacent thereof for engaging an end of a secondary containment pipe, (d) a flexible secondary containment pipe interconnecting adjacent access chambers and interconnected at each end with its corresponding access chamber pipe receiving opening and interengaging the adjacent engaging element of the access chamber side walls to thereby provide a sealed linear multiple segmented secondary containment pipe line, (e) a flexible inner fluid pipe section disposed within each secondary containment pipe which extends at each end thereof through the access chamber opening and into the access chambers, (f) the flexible pipe having a coupling element at each end which interengages the coupling of an opposed inner fluid pipe coupling to thereby provide an inner pipe removal coupling which is disposed within the common access chamber, (g) the flexible inner supply pipe and its associated couplings and fittings being of sufficient strength to withstand internal fluid pressures, (h) the secondary containment pipe has a substantially larger diameter than that of the flexible inner fluid pipe whereby the inner flexible pipe can be removed from an adjacent access main after uncoupling.

27. The secondarily contained piping system as set forth in claim 26, wherein:

(a) the secondary containment pipe is a flexible pipe which can be disposed in a curvilinear line.

28. The secondarily contained piping system as set forth in claim 27, wherein:

(a) the connecting element for the secondary containment pipe is an annular cuff and tightening band assembly.

29. A secondarily contained fluid distribution system, comprising:

(a) a plurality of access chambers;

(b) a secondary containment pipe having a plurality of segments, a first of said segments extending between a first and a second of said plurality of access chambers and a second of said segments extending between the second and a third of said access chambers;

(c) a primary containment pipe extending through said secondary containment pipe from said first through the second to the third access chamber, said primary containment pipe being flexible and having a plurality of segments;

(d) a plurality of disconnectible fittings securing segments of said primary containment pipe together in end to end relationship, at least some of said access chambers each having at least one of said disconnectible fittings located therein;

(e) the flexibility of said primary containment pipe and the configuration of said access chambers being such that upon disconnection of the two of said disconnectible fittings securing opposite ends of a single segment of said primary containment pipe, said segment may be withdrawn from said secondary containment pipe through one of said access chambers for inspection and replacement.

30. A secondarily contained fluid distribution system for supplying fuel to a plurality of fuel dispensers, comprising:

(a) a plurality of access chambers;

(b) a secondary containment pipe extending in series between said access chambers;

(c) a flexible primary containment pipe extending through both its respective secondary containment pipe and said secondary containment pipe;

(d) a plurality of disconnectible fittings in said primary containment pipe, said fittings connecting segments of said primary containment pipe, at least some of said disconnectible fittings each being located in a corresponding one of said access chambers;

(e) the flexibility of said primary containment pipe and the configuration of at least one of said access chambers being such that upon disconnection of two of said disconnectible fittings, a segment of said primary containment pipe may be withdrawn through an access chamber to an above ground location and a substitute segment inserted through said access chamber; and (f) a plurality of fuel dispensers, each being associated with a corresponding one of said access chambers and being in fluid communication with the primary containment pipe within said corresponding access chamber.

31. A secondarily contained fluid distribution system for supplying fuel to a plurality of fuel service dispensers, comprising:

(a) a plurality of liquid fuel dispensing units for supplying fuel to motor vehicles, (b) an underground access chamber disposed beneath each fuel dispensing unit for receiving the ends of fuel supply pipe sections, has an open top adjacent ground level, and fuel line receiving openings in its side walls, (c) an underground secondary containment pipe interconnecting adjacent access chambers, the ends of which interconnect the fuel line receiving openings in each interconnected access chamber side wall to provide a fluid tight system, (d) the access chambers being interconnected by the secondary containment pipe sections to form a fluid tight series configured distribution routing line, (e) the first access chamber having its second fuel line opening interconnected with a containment pipe and a corresponding fuel supply pipe of a fuel supply system, (f) a last such interconnected access chamber having a single fuel line opening in its side wall and all of the remaining access chambers having two fuel line openings in their side walls, (g) a flexible fuel supply pipe disposed within and extending the length of each interconnecting secondary containment pipe which is sized to provide sufficient clearance to permit it to be readily moved therethrough, (h) the flexible fuel supply pipe at each end extending through the fuel line receiving openings of the connected access chambers, (i) a disconnectable fitting disposed on each end and in each intermediately positioned access chamber, which interconnects the adjacent opposed ends of flexible fluid pipes disposed within each access chamber, and which also includes an element which connects such fitting to the fluid dispenser disposed above the access chamber, (j) a connecting fitting disposed in the last access chamber for connecting the end of the flexible fuel supply pipe disposed therein to the fuel dispenser assembly disposed immediately above it, and (k) the relative dimension of the access chamber and the containment pipe with respect to the size and minimum beng radius of the flexible fuel pipes being sufficient to permit uncoupling of any given flexible pipe at its ends and the removal and subsequent replacement thereof.

32. The secondarily contained fluid fuel distribution system as set forth in claim 31, wherein:

(a) a first fuel supply island contains at least two liquid fuel dispensers, (b) a second fuel supply island is spaced from the first fuel dispenser island and contains at least two fuel dispensers.

33. The secondarily contained fluid fuel distribution system as set forth in claim 32, wherein:

(a) at least one of the secondary containment pipes is flexible and does not follow a straight path.

34. The secondarily contained fluid fuel distribution system as set forth in claim 33, wherein:

(a) the bent flexible containment pipes interconnecting adjacent access chambers is bent to change the direction of the flow approximately 180 degrees.

35. The secondarily contained fluid fuel distribution system as set forth in claim 31, wherein:

(a) the access chamber has at least an additional pair of fuel line openings for receiving the ends of an additional pair of fuel supply pipe sections, (b) an additional underground secondary containment pipe section interconnects the access chambers and the ends thereof interconnect the additional fuel line receiving openings to provide a fluid tight system, (c) the first access chamber having one of the additional fuel line openings interconnected with a containment pipe and a corresponding fuel supply pipe, (d) the last connected access chamber having an additional fuel line opening through its side wall, (e) a flexible fuel supply pipe disposed within each secondary containment pipe which is sized to provide sufficient clearance to permit it to be readily moved therethrough, (f) the flexible fuel supply pipe ends extending through the additional fuel line recovering openings of the access chamber, (g) an additional disconnectable fitting disposed in each intermediately positioned access chamber, which interconnects the adjacent opposed ends of flexible fluid pipes disposed within each access chamber and which also includes an element which connects the fitting to the fluid dispenser disposed above the access chamber, (h) an additional connecting fitting disposed in the last access chamber for connecting the end of the additional flexible supply pipe disposed therein to the fuel dispenser assembly disposed immediately above it, and (i) the relative dimension of the access chamber and the additional containment pipe with respect to the size and minimum bend radius of the additional flexible fuel pipes being sufficient to permit uncoupling of any given flexible at its ends and the removal and subsequent replacement thereof.

36. The secondarily contained fluid fuel distribution system, as set forth in claim 31, wherein:

(a) the secondary containment pipes are of sufficiently large sizes to permit substitution of larger diameter flexible fuel supply pipes.

37. The secondarily contained fluid fuel distribution system as set forth in claim 31, wherein:

(a) the secondary containment pipe sections are corrugated thin walled plastic which is permeable and resistant to fluid fuels, and (b) the wall thickness is approximately 50-100 mils.

38. The secondarily contained fluid distribution system, as set forth in claim 31, wherein:

(a) the access chamber includes a cuff member integral with the side wall of the access chamber adjacent the fuel line receiving opening, and (b) a resilient cylindrical sealing element is disposed in contact with the cuff member for interengaging the end of the secondary containment pipe.

39. The secondarily contained fluid distribution system, as set forth in claim 38, wherein:

(a) tightening means is disposed about the cuff to circumferentially compress it and the resilient cylindrical sealing element into firm locking engagement with the end of the secondary containment pipe.

40. The secondarily contained fluid distribution system, as set forth in claim 31, wherein:

(a) the cuff extends inwardly from the access chamber wall.

41. The secondarily contained fluid distribution system, as set forth in claim 38, wherein:

(a) the secondary containment pipe has a corrugated ribbed configuration, and (b) the resilient cylindrical sealing element has annular ribs which interfit with the external periphery of the secondary containment pipe to provide a fluid-tight fit.

42. The secondarily contained fluid distribution system, as set forth in claim 38, wherein:

(a) the minimum clearance between the point where the flexible fluid supply pipe enters the chamber and the opposite chamber wall is greater than the bend radius of the flexible fluid supply pipe.

43. The secondarily contained fluid distribution system, as set forth in claim 38, wherein:

(a) leak detection means is disposed within the access chamber and is connectable to an alarm system for providing an indication of leakage from the pipes or an associated coupling.

44. The secondarily contained fluid distribution system, as set froth in claim 43, wherein:

(a) the leak detection means includes a fluid sensor disposed in the bottom of the access chamber.

45. The secondarily contained fluid distribution system, as set forth in claim 38, wherein:

(a) the secondary containment pipe is circular in cross-section and has an inner diameter approximately 1 ½ to 2 times greater than the diameter of the flexible supply pipe.

46. The secondarily contained fluid distribution system, as set forth in claim 42, wherein:

(a) the bend radius is equal to 1 ½ to 3 times the diameter of the flexible supply pipe.

47. The secondarily contained fluid distribution system, as set forth in claim 38, wherein:

(a) the access chamber has a vapor return line opening with a seal about its periphery to accommodate a vapor return line which passes through the access chamber.

* * * * *